Nov. 5, 1929.  H. G. LYKKEN  1,734,387
RING FLOW REVERBERATORY FURNACE
Filed Aug. 28, 1925

Inventor:
Henry G. Lykken,
by Wallace R. Lane Atty.

Patented Nov. 5, 1929

1,734,387

UNITED STATES PATENT OFFICE

HENRY G. LYKKEN, OF MINNEAPOLIS, MINNESOTA

RING-FLOW REVERBERATORY FURNACE

Application filed August 28, 1925. Serial No. 53,035.

This invention relates to furnaces, especially of the reverberatory type, adaptable for many purposes, such as melting and remelting of metals, the making of malleable steel, the treatment of steel, and the reduction of ores to metals.

One of the objects of my invention is to provide a furnace construction of the above character which will effect the transfer of the maximum number of heat units from the products of combustion to the charge on the hearth during the passage of the products of combustion through the furnace.

Another one of the objects of the invention is to provide a reverberatory furnace adapted for the burning of pulverized coal and air and constructed so that the charge on the hearth of the furnace is heated not only by the direct contact of the products of combustion from this flame but also by the radiant heat from the projected flame of the burning mixture of air and pulverized coal.

Still another object of my invention resides in providing a reverberatory furnace wherein the hearth and its overlying roof are constructed with relation to the flaming fuel inlet and the gas outlet so that the flaming products of combustion pass directly across the roof of the furnace whereby to highly heat the roof and thereby radiantly heat the charge on the hearth, and thence pass downwardly and in a reverse direction across the hearth and out the gaseous inlet whereby also to heat the charge on the hearth by direct contact.

Another object of my invention resides in the construction of the fuel inlet for the mixture of air and powdered coal and its disposition together with the gas outlet at the same end of the hearth, the gas outlet being located below the fuel inlet whereby the products of combustion are caused to travel through and across the furnace in a substantially closed or ring-like path to heat the charge on the hearth not only by radiant heat but also by direct contact.

Yet another object of my invention resides in the construction of the fuel inlet passage and its location slightly below the roof of the hearth.

Still another object of my invention resides in the construction of the fuel inlet means to provide a relatively long refractory passageway, the orifice of which discharges into the furnace and in locating the combined air and coal dust burner at a point removed from the orifice of the passageway so that the burning mixture is heated in its travel through the refractory passage and is caused to expand and be projected into the furnace.

Still another object of my invention resides in providing the furnace with a hearth and overlying roof having substantially circular walls together with a fuel inlet and gas outlet disposed at one end of the hearth and in superimposed relation, together with means for controlling the exit of the gases from the hearth.

Still another object of my invention resides in the process of heating a charge in the furnace by passing products of combustion therethrough in such a way that the charge is heated not only radiantly but also by direct contact with the products of combustion.

These and other objects of my invention will be apparent from a perusal of the following specification when taken in connection with the accompanying drawings wherein:—

Figure 1:
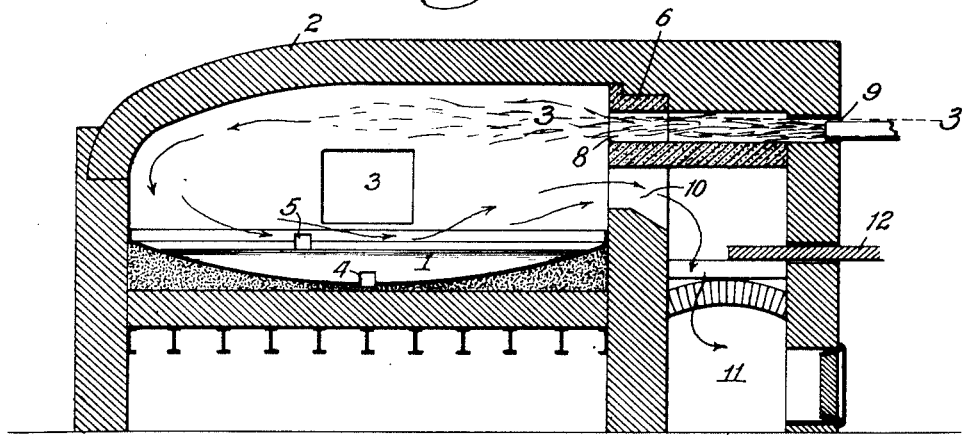
Figure 1 is a side view partly in section showing one form of my invention as applied to a reverberatory furnace.
Figure 2:
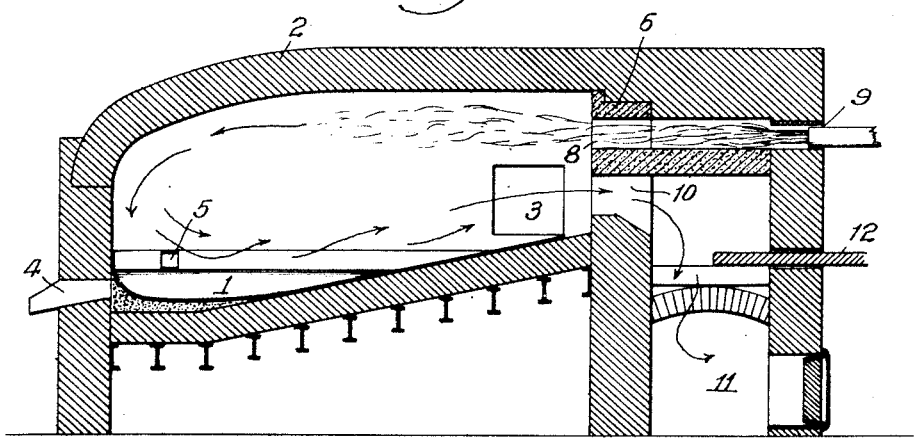
Figure 2 is a side view in section showing the invention applied to a reverberatory furnace of a slightly different construction.
Figure 3:
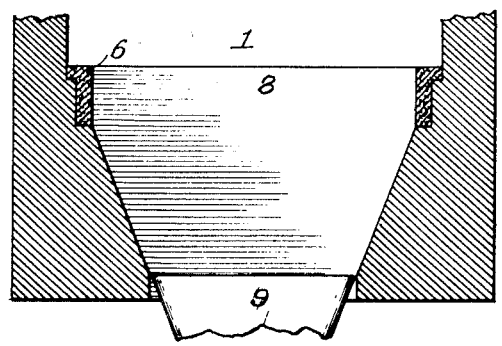
Fig. 3 is a horizontal cross-section taken on the line 3—3 of Fig. 1, illustrating the shape of the nozzle.

Referring now to the drawings in detail, in the furnace which is preferably of the reverberatory type, the hearth 1 is shown as substantially dish-shaped in Figure 1 and is shown in Figure 2 as a modified construction having an upwardly sloping surface for the gas inlet. Obviously other designs of furnace are within the contemplation of my invention. The furnace is provided with a roof 2 overlying the hearth and with its inner wall surface curved substantially as shown in the drawings and in somewhat spaced relation from the surface of the hearth. In addition the furnace is provided with one or more charging doors 3 located as desired with a tap hole 4 for the metal and a tap hole 5 for the slag. Obviously these tap holes may be located as desired.

At one end of the hearth the furnace is provided with a fuel inlet and a gas outlet. These are arranged in superimposed relation with the fuel inlets disposed above the gas outlet. The fuel inlet comprises a relatively long preferably annular passage 6 constructed of refractory material through which the burning pulverized coal and air travel to the furnace 7 located preferably at the extreme inlet end 8 of the passage. This passage 6 preferably extends the full width of the furnace so as to give a thin flame sheet the full width of the furnace and with a very low entrance velocity. The fuel burner 9 through which the mixture of pulverized coal and air is introduced into the passageway 6 is constructed so that the relative amount of air and coal may be varied thus to produce in the furnace either an oxidizing or a reducing atmosphere corresponding to the purpose for which the furnace is intended.

Particular attention is called to the fact that the passage 6 and its orifice 8 is located somewhat below the roof of the furnace so as to provide for the expansion of the flame without the effect of erosion.

The outlet 10 for the products of combustion is disposed below the orifice 8 and at the same end of the hearth. It connects to the chimney at 11 and is provided with a refractory gate 12 to regulate the outgoing gases.

By my new method of heating a charge in a reverberatory furnace I propose not only to heat the charge by direct contact with the products of combustion but also to impart the maximum amount of heat to the charge by radiation from the flame or products of combustion. By means of my method as carried out by this new type of furnace the mixture of air and pulverized coal as it passes out of the burner 9 and through the refractory passage 6 is heated by the walls of the latter and thereby expands and is projected into the furnace as a thin flame sheet the full width of the furnace and at a low entrance velocity substantially across the roof 2 of the furnace. Due to the shape and arrangement of the walls of the roof 2 and hearth 1, the products of combustion are thence caused to pass in a somewhat circular or ring-like flow downwardly and in a reverse direction across the face of the hearth into direct contact with the charge on the hearth. The gases then pass through the outlet 10 and escape through the chimney 11 to waste heat boilers or to any type of air heating devices. In passing through the furnace the products of combustion first form a flame sheet across the roof of the furnace thereby effecting a downward projection of radiant heat onto the charge on the hearth. These same products of combustion then double downwardly and backwardly across the charge on the hearth and still further heat the charge by direct contact. In this manner by burning the pulverized coal in a flame sheet overlying the material to be treated, from twenty-five to thirty percent of the heat generated can be introduced preliminarily into the charge directly by radiation thereby materially increasing the efficiency over the type of furnace where the fuel is burned in a separate combustion chamber. To obtain the maximum efficiency the flame sheet is provided substantially the full width of the furnace. It will be evident that this double heating of the charge on the hearth by causing the flame or its product of combustion to turn about and flow back over the charge in intimate contact with it effects the maximum transfer of heat units. While the returning gas is somewhat cooler than the flame above, yet it is hotter than the material to be treated and therefore will not detract from the transfer of radiant heat from the flame for the reflection of such radiant heat from the roof. In addition the doubling back of the flame also assists in the combustion and helps to trap the ashes in the coal forming slag with the charge. In regard to the utilization of a mixture of powdered coal and air it will be evident that no injurious effects to the charge on the hearth can result from sulphur in the coal since the sulphur is thoroughly oxidized out of contact with the charge, this being due to the fact that the flame is projected along the roof 2 in spaced relation from the charge on the hearth and is constantly screened from the charge by the blanket of products of combustion flowing between the flame sheet and the charge on their passage to the gas outlet 10. It is evident that in this type of furnace either cold air or heated air may be used in connection with the combustion of the pulverized coal.

Having thus described my invention, what I claim as new is:—

1. A furnace comprising a main heating chamber, and a refractory fuel chamber having a relatively small fuel inlet and a relatively wide and elongated fuel discharge outlet, said discharge outlet extending horizontally for substantially the full width of the main chamber to discharge the fuel into the main chamber in a relatively thin stratum of flame, the fuel chamber being located to be heated by a part of the flame to preheat the fuel therein.

2. A furnace comprising a main heating chamber, and a fuel nozzle having refractory interior surfaces and a discharge port extending substantially the full width of the chamber, the vertical dimension of the nozzle being relatively small, the length of the nozzle being sufficient to allow the preheating of the fuel approximately to its ignition temperature.

3. A furnace comprising a main heating chamber, and a fuel nozzle having refractory interior surfaces and a discharge outlet of relatively small vertical dimension, the outlet being substantially as wide as the main chamber, the main chamber having a fuel exhaust port below said nozzle and near the same end of the chamber, the nozzle and ports being so constructed as to preheat the fuel inside the nozzle and to discharge a thin stratum of flame throughout the width of the furnace to the remote end of the furnace and thence downwardly and back to the exhaust port.

4. A furnace comprising a main heating chamber having a fuel exhaust port near one end thereof, and a nozzle of small vertical dimensions having a discharge port substantially as wide as said chamber, the nozzle having refractory interior surfaces, the floor of the nozzle being thin and having its under surface in contact with the gases passing out of said exhaust port, the exhaust gases thereby aiding the preheating of the fuel passing through the nozzle.

5. A furnace comprising a main heating chamber having a fuel exhaust port near one end thereof, a nozzle of small vertical dimensions having a discharge port substantially as wide as said chamber, the nozzle having refractory interior surfaces, the floor of the nozzle being thin and having its under surface in contact with the gases passing out of said exhaust port, and means for regulating the exit of the burnt gases independently of the incoming gases.

In witness whereof, I hereunto subscribe my name to this specification.

HENRY G. LYKKEN.